(12) United States Patent
Smithwick et al.

(10) Patent No.: US 11,099,403 B2
(45) Date of Patent: Aug. 24, 2021

(54) MIRROR DISPLAY WITHOUT VIEWER REFLECTION

(71) Applicant: DISNEY ENTERPRISES, INC., Burbank, CA (US)

(72) Inventors: Quinn Y. Smithwick, Pasadena, CA (US); Daniel M. Joseph, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 454 days.

(21) Appl. No.: 16/190,262

(22) Filed: Nov. 14, 2018

(65) Prior Publication Data

US 2020/0150448 A1      May 14, 2020

(51) Int. Cl.
| | | |
|---|---|---|
| *G02B 30/52* | (2020.01) | |
| *G02B 27/14* | (2006.01) | |
| *G02B 30/25* | (2020.01) | |

(52) U.S. Cl.
CPC ........... *G02B 30/52* (2020.01); *G02B 27/144* (2013.01); *G02B 30/25* (2020.01)

(58) Field of Classification Search
CPC ........ G02B 30/52; G02B 30/25; G02B 30/50; G02B 30/60; G02B 30/00; G02B 30/26; G02B 30/35; G02B 30/36; G02B 27/144; G02B 27/095; G02B 27/0955; G02B 27/0977; G02B 27/10; G02B 27/179; G02B 27/14; G02B 27/1066; G02B 27/286; G02B 27/0018; G02B 1/11; G02B 2027/0118; G02B 5/30; G06T 15/00; G03B 15/10; A63J 5/00; A63J 5/02; A63J 5/021; H04N 9/12

USPC .......................................................... 359/478
See application file for complete search history.

(56) References Cited

U.S. PATENT DOCUMENTS

| | | | |
|---|---|---|---|
| 6,817,716 B1 * | 11/2004 | Hines ..................... | G02B 30/56 353/10 |
| 7,414,831 B1 * | 8/2008 | Brown .................. | G02B 27/144 361/679.27 |
| 7,900,384 B2 * | 3/2011 | Schnuckle ......... | A47G 19/2227 40/324 |
| 2017/0251172 A1 * | 8/2017 | McNelley .............. | H04N 7/147 |
| 2018/0284464 A1 * | 10/2018 | Lu ........................... | G02B 27/14 |

* cited by examiner

*Primary Examiner* — Jade R Chwasz
*Assistant Examiner* — Jyotsna V Dabbi
(74) *Attorney, Agent, or Firm* — Snell & Wilmer L.L.P.; Kent A. Lembke

(57) ABSTRACT

A compact mirror-based three-dimensional (3D) display system with a polarizer between the viewer in a viewing space and a beam splitter. The beam splitter may be a half-silvered mirror, and the polarizer may be a circular polarizer that acts to cancel the undesired reflections including that of a viewer. A half prop often will be positioned between the beam splitter and the polarizer. The mirror-based 3D display system may also utilize additional components for creating effects that move in depth and that are in 3D. This may include rotation of the display (or its monitor or display screen) from parallel to an offset angle to allow displayed images to move toward and away from the mirror and not be locked into a plane parallel to and often abutting the mirror. The display system may further include configurations that provide a backdrop image behind the displayed image.

42 Claims, 7 Drawing Sheets

MIRROR DISPLAY WITHOUT VIEWER REFLECTION

BACKGROUND

1. Field of the Description

The present description relates, in general, to compact display systems to provide a three-dimensional (3D) mirror illusion, and, more particularly, to systems and methods for producing 3D images or depth and space media illusions without requiring viewers to wear 3D glasses or other eyewear by using mirror techniques combined with other optical components and arrangements to eliminate viewer reflection that had hindered prior mirror-based displays.

2. Relevant Background

There is a growing demand for displays that include 3D imagery to capture attention and entertain visitors of a facility. One conventional approach to providing 3D imagery without the need for 3D or other special eyewear has been the use of Pepper's Ghost displays. Pepper's Ghost is an illusionary technique used by magicians, by ride or attraction designers, and by others to produce a 3D illusion of a latent or ghost-like image. Using a simple piece of plate glass or transparent plastic (e.g., a Mylar sheet) that acts as a beam splitter and special lighting techniques, Pepper's Ghost systems can make objects appear and disappear within a scene or room.

Conventionally, these systems include a main room or scene that is readily viewed by an audience or viewers and a hidden room that is not visible to the audience/viewers. Both rooms may be identical in their physical structure including furniture and other objects except the hidden room may include additional objects or characters such as a ghost. A large piece of glass/plastic or a half-silvered mirror is situated between the viewer and the scene at an angle, such as at about 45 degrees. When the main room is illuminated and the hidden room is darkened, the viewer only sees the main room as the hidden room does not reflect from the glass and the sheet of glass is itself hard to see as it typically extends across the entire view of the main room.

Pepper's ghost then becomes very visible to the viewer when the entire hidden room or portions such as the ghost or other character are brightly lit. Since only a portion of the light cast upon the ghost or other objects in the hidden room is reflected from the glass/plastic sheet, the reflected images appear as latent or ghostly images relative to the objects in the main room (e.g., the reflected images or images superimposed in the visible room may appear to float). The Pepper's Ghost image is a 3D image that may be a still image or animation may be provided such as with animatronics providing the "ghost" or by placing a live actor in the hidden room. In a broad sense, the Pepper's Ghost systems may be thought of as implementing autostereoscopy, which is generally a method of displaying 3D images that can be viewed without the use of headgear or glasses on the part of the user. One of the main limitations of conventional Pepper's Ghost displays is that their typical size is quite large, i.e., a whole room plus a similarly sized adjacent room.

However, there are many settings, such as a queue into a theater, ride or other park attraction, a display window of a retail or other facility, and other locations where groups of people pass, where it is highly desirable to provide much more compact eye-catching visual displays and 3D entertainment. Therefore, there remained a need for other display configurations that would be useful when relatively small spaces are available (e.g., a space that is one to several feet on each side).

To produce a compact 3D illusion with synthetic characters or effects appearing on or around physical objects, it has been common to use a variation of the Pepper's Ghost illusion. FIG. 1A illustrates an exemplary layout of such a Pepper's Ghost display system 100 operating to provide a compact 3D illusion. The system 100 is positioned in or near a viewing space 102 in which a viewer 105 is located. The system 100 includes a display 110 such as a liquid crystal display (LCD) monitor that operates to display an image 114 (here, a pawn of a chess set). A beam splitter 120 in the form of a planar half-silvered mirror is positioned in the system 100 to be parallel to and spaced apart a small distance from the display 110 with a first or outer surface 122 facing the space 102 and viewer 105.

A physical half prop 130 (here, half a pedestal) is placed in abutting contact with the outer surface 122 of the beam splitter or mirror 120 so that its upper or top surface 131 is orthogonal to a lower edge of the display 110, while the beam splitter 120 may be sized to be larger than the display 110 and extend to the bottom of the half prop 130 as shown in FIG. 1A. The vertical, partially-silvered mirror 120 completes the image of the half prop 130 as can be seen at 132 and with extended top surface 133 of physical surface 131, and the mirror 120 also allows a direct view of the image 114 on the display 110 (or its monitor 111) hidden directly behind (and, often, in contact with) the half-silvered mirror or beam splitter 120.

FIG. 1B illustrates a side view of the system 100 showing that the monitor 111 of the display 110 is parallel to and faces a second or inner (or back) surface 123 of the beam splitter 120. Light 115 output from the monitor 111 passes, with some blockage, to the viewer 105 to provide a direct view of the image 114. Light 134 bouncing off surfaces 131 of the half prop 130 strike the first or outer surface 122 of the beam splitter 120 and are reflected as reflected light 136 to the viewer 105 which, as shown with dashed line 137, completes the half prop as shown for top surface 131 at 133 (e.g., the reflected light 136 appears to be coming from a point behind the beam splitter 120). Unfortunately, ray tracing 107 also shows that light bouncing off the viewer 105 is also reflected from the first or outer surface 122 toward the viewer 105.

FIG. 1C provides a typical 3D illusion achieved (e.g., from a viewer's perspective) with the use of the conventional Steinmeier illusion display system 100. It shows a completed half prop 130 at 132 including the full top surface 131 with reflected surface images 133, and the displayed image 114 appears to be on the completed top surface 133. However, the viewer 105 also often will see their own reflection 108 via the half-silvered mirror 120. The illusion can be ruined by the undesired reflections of the environment or the visitor (as shown with reflection 108) from the mirror's surface 122. Other problems with use of the system 100 include that the virtual object or effect 114 only appears at the plane of symmetry, which limits the positioning of the object 114 and possibly gives away the way the effect is achieved to the viewer 105. There also is no backdrop behind the physical prop 130 and virtual object 114.

Hence, there remains a need for an improved compact 3D display system that can be used to provide 3D illusions and effects without requiring a viewer to wear special eyewear.

Preferably, the improvements would include avoiding reflecting back images of the viewers.

SUMMARY

The inventors discovered that reflections of viewers can be eliminated in a new compact mirror-based 3D display system by positioning a polarizer between the viewer in a viewing space and the beam splitter, which may take the form of a silvered mirror (e.g., partially or half-silvered mirror), while maintaining the illusion of a displayed image on, in, or around a completed reflected prop. The polarizer may be a circular polarizer and acts to cancel the undesired reflections.

The new mirror-based 3D display system may provide further enhancements by including rear-facing imagery provided behind the polarizer, which are reflected from the front or first surface of the partially silvered mirror into the viewing space and extend the scene that appears to be located behind the mirror. The mirror-based 3D display system may also utilize additional components for creating effects that move in depth and that are in 3D. This may include rotation of the display (or its monitor or display screen) from parallel to an offset angle that often will be in the range of 15 to 60 degrees (e.g., 25 to 45 degrees or the like) to allow displayed images to move toward and away from the mirror and not be locked into a plane parallel to and often abutting the mirror.

More particularly, a display system is provided for creating a 3D effect while controlling reflections of a viewer or other exterior objects. The system includes a viewing space, and a planar beam splitter with a first surface facing the viewing space and a second surface facing away from the viewing space. The system further includes a polarizer disposed between the first surface of the beam splitter and the viewing space blocking light originating in the viewing space and reflected by the beam splitter. Additionally, the system includes a physical prop positioned between the beam splitter and the polarizer. The 3D effect is achieved with the system by providing a display with a display screen facing the second surface of the beam splitter. The display is operated to provide a displayed image on the display screen viewable in the viewing space concurrently with light from the physical prop reflected by the beam splitter through the polarizer.

In some embodiments, the polarizer is a circular polarizer with a planar or curved body. In such cases, the polarizer may further include an anti-reflection coating on a surface of the body facing the viewing space. In the same or other embodiments, the system may include an opaque framing panel disposed between the polarizer and the physical prop. The framing panel includes an aperture passing light to and from the viewing space, and the framing panel further includes a back surface facing the first surface of the beam splitter and including backdrop imagery or objects. In some preferred embodiments, the display is a 3D display. In these or other useful implementations, the display system includes a lens disposed between the display screen and the beam splitter focusing the displayed image to a location between the beam splitter and the polarizer.

In one specific embodiment where it is desirable to provide a backdrop without a framing panel, the polarizer includes a ¼ wave film proximate to the physical prop and a horizontal polarizer proximate to the viewing space. In such systems, a polarization preserving screen may be disposed between the ¼ wave film and the horizontal polarizer, and a projector is included that projects a backdrop image onto a surface of the polarization preserving screen facing the viewing space. Also, in such systems, a circular polarizer may be disposed between the display and the beam splitter. The ¼ wave film and the horizontal polarizer can both be planar, spaced apart, and arranged to be parallel. Further, it may be useful that the projector be a short throw video projector, and the projector and display be concurrently operated to provide the displayed image and to project the backdrop image.

DETAILED DESCRIPTION OF THE PREFERRED EMBODIMENTS

Briefly, embodiments described herein are directed toward mirror-based three-dimensional (3D) display systems. The new mirror-based 3D display systems combine the use of a beam splitter (i.e., an optical device that splits a beam of light into two beams with one transmitted through and one reflected such as a partially or half-silvered mirror or more generally a pellicle mirror), which both transmits and reflects light along with a physical prop, a display positioned behind the beam splitter, and a polarizer positioned between the beam splitter's first or outer surface and a viewing space in which viewers are located. The polarizer, which may be a circular polarizer in some cases, acts to cancel out undesired reflections including reflections of light from the viewing space that would have otherwise included the viewer's own image.

Figure 2A:
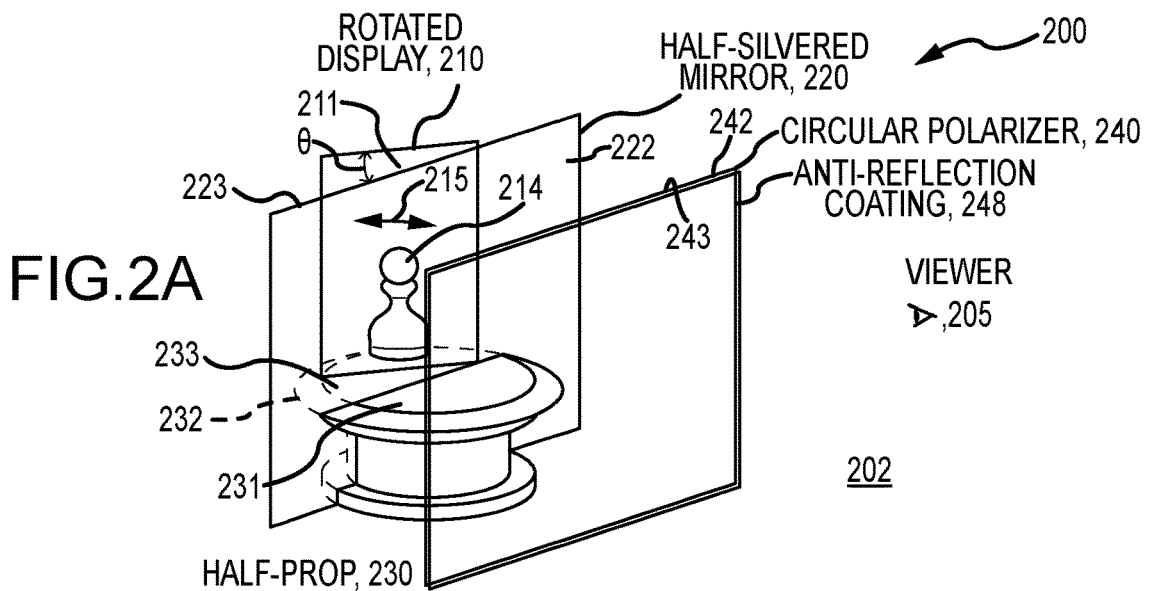
FIGS. 2A-2C are, respectively, a perspective view of a new mirror-based 3D display system of the present description during operation, a side view of the display system of FIG. 2A showing a ray tracing, and a front view or viewer perspective of the display system of FIGS. 2A and 2B.
Figure 2B:
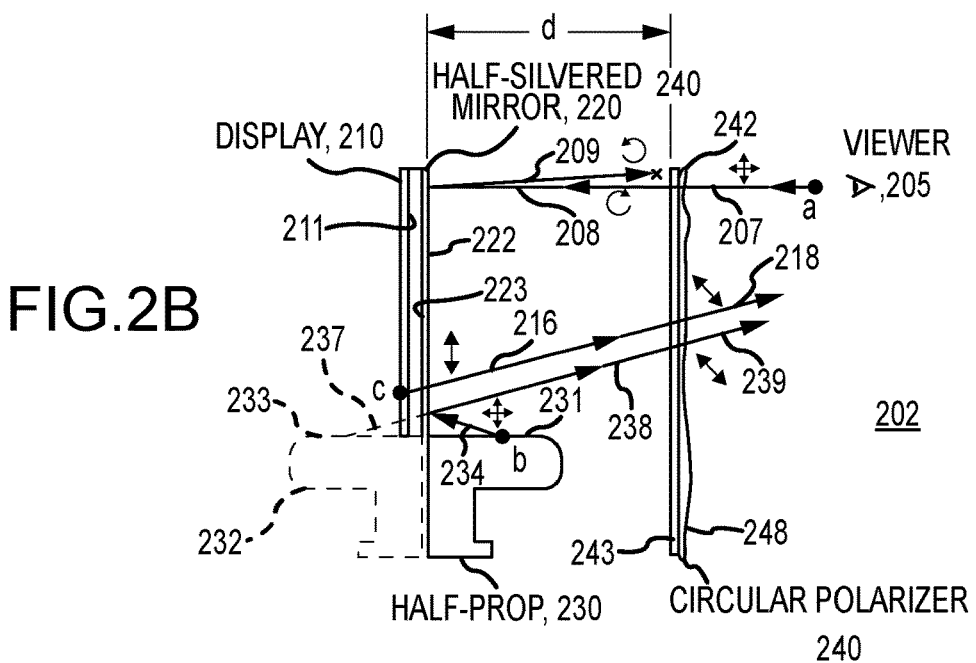
Figure 2C:
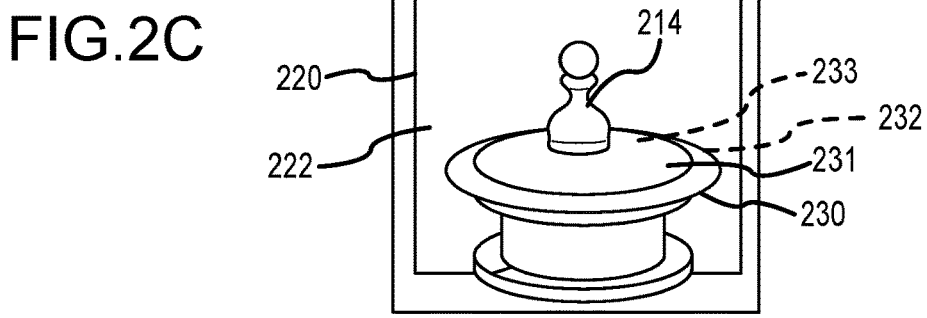

To produce a compact 3D illusion with synthetic characters or effects appearing on or around physical objects while eliminating viewer's reflections, the inventors designed the mirror-based 3D display system 200 shown in FIGS. 2A-2C. FIG. 2A illustrates an exemplary layout for a new mirror-based 3D display system 200 operating to provide a compact 3D illusion. The system 200 is positioned in or near a viewing space 202 in which a viewer 205 is located. The system 200 includes a display 210 such as a liquid crystal display (LCD) with monitor/display screen 211 that is operating to display an image 214 (here, a pawn of a chess set), which may be a still image or an animated image (i.e., a video stream on monitor 211).

Figure 1A:
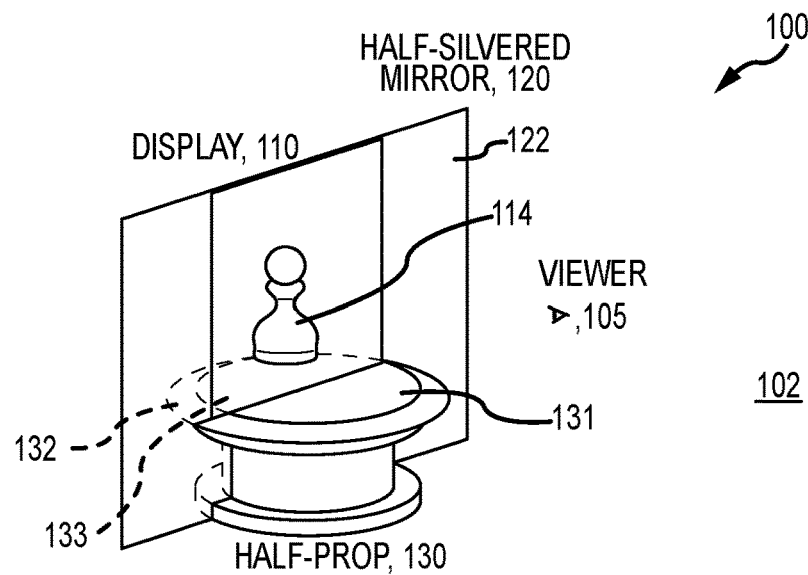
FIGS. 1A-1C are, respectively, a perspective view of a Steinmeier illusion display system during operation, a side view of the display system of FIG. 1A showing a ray tracing, and a front view or viewer perspective of the display system of FIGS. 1A and 1B.
Figure 1B:
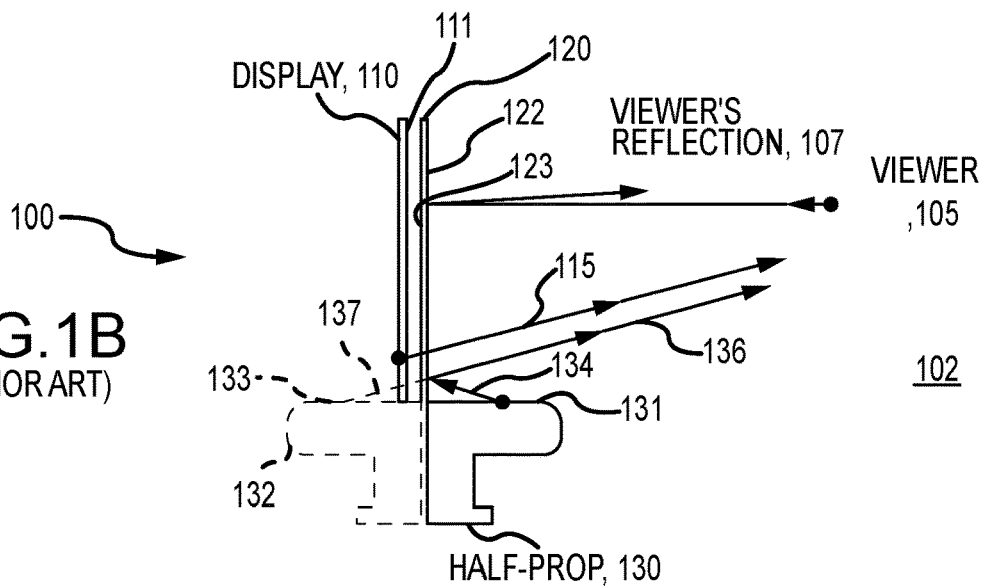
Figure 1C:
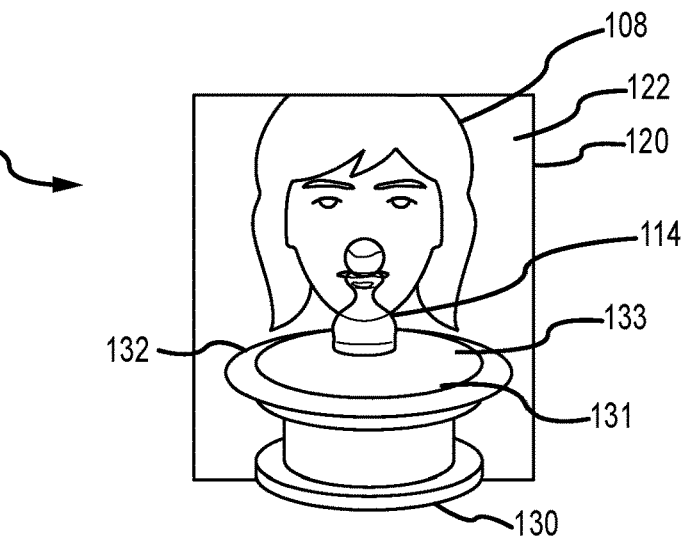

A beam splitter 220, which may be in the form of a planar half-silvered mirror, is positioned in the system 200 between the viewing space 202 and the display monitor/display screen 211, with a first or outer surface 222 facing the space 202 and viewer 205 and with a second or inner (or back) surface 223 facing toward the display 210. The display screen 211 may be parallel to the back surface 223 (as shown in FIGS. 1A and 1B with screen 111), or, more preferably as shown, the display screen 211 is rotated relative to the plane of the back surface 223 (such as with a forward edge abutting or near the back surface 223) to be vertical (or with a longitudinal axis parallel to that of mirror 120) but at an offset angle, θ, in the range of 15 to 60 degrees (e.g., 25 to 45 degrees or the like). This allows displayed images 214 to be selectively moved toward and away from the mirror 210 as shown with arrows 215, such as by choosing the animated images/video stream fed to the display 210 by a system controller not shown but understood to be a video server or the like to cause the image 214 to move to the left and right on the screen 211, and not be locked into a plane parallel to and often abutting the mirror (as in system 100).

A physical half prop 230 (here, half a pedestal) is placed in abutting contact with the outer surface 222 of the beam splitter or mirror 220 so that its upper or top surface 231 is orthogonal and coplanar to a lower edge of the display 210. The beam splitter 220 may be sized to be larger than the display 210 and may extend to the bottom of the half prop 230 as shown in FIG. 2A. The vertical, partially-silvered mirror 220 completes the image of the half prop 230 as can be seen at 232 and with extended top surface 233 of physical surface 231 by reflecting light (e.g., half of the light it receives on surface 222). The beam splitter 220 transmits light (e.g., half of the light that strikes its surface 223) so that it allows a direct view of the image 214 on the display 210 (or its monitor/display screen 211) hidden directly behind the half-silvered mirror or beam splitter 220.

Further, and significantly, the display system 200 further includes a polarizer 240 disposed between the viewing space 202 (and viewer 205) and the first or outer surface 222 of the beam splitter 220. The polarizer 240 may be planar as shown or have an arcuate or semi-circular cross section in some cases. The polarizer 240 may be a circular polarizer with a first or front (outer) surface 242 facing toward the viewing space 202 (and viewer 205) and a second or back (inner) surface 243 facing toward the beam splitter 220, and the polarizer 240 may be vertical (when the beam splitter 220 is vertical, for example) and may be parallel to and spaced apart a distance, d (as seen in FIG. 2B, e.g., 0 to 12 inches or more to suit the size of the physical prop 230) from the first/outer surface 222 of the beam splitter 220. An anti-reflection coating (or layer of anti-reflective material) 248 may be applied to the first or outer surface 242 of the polarizer to further reduce reflection of light from the viewing space 202. As discussed below, the polarizer 240 is included in the display system 200 to cancel the undesired reflections into the viewing space 202, especially of the viewer 205.

FIG. 2B illustrates a side view of the system 200 showing that the monitor 211 of the display 210 is rotated but still faces the second or inner (or back) surface 123 of the beam splitter 220. Light 216 output from the monitor/display screen 211 passes (is transmitted), with some blockage (e.g., 50 percent), to the viewer 205 in space 202 to provide a direct view of the image 114 after passing through circular polarizer 240 as shown at 217. Light 234 bouncing off surfaces 231 of the half prop 230 strike the first or outer surface 222 of the beam splitter 220 and are reflected (e.g., 50 percent) as reflected light 238 to the viewer 205 via the circular polarizer 240 which, as shown with dashed line 237, completes the half prop as shown for top surface 231 at 233 (e.g., the reflected light 238 and the polarized light 239 appears to be coming from a point behind the beam splitter 220). Further, ray tracing 207, 208, and 209 shows that light bouncing off the viewer 205 is reflected from the first or outer surface 222 toward the viewer 205 but is blocked from view by the polarizer 240.

As shown, the light reflected off the viewer's face 207 or any other object or surface outside the display system 200 is typically randomly polarized. After passing through the polarizer 240 (e.g., a right circular polarizer), this light 208 is (right) circularly polarized. It reflects as shown at 209 off the half-mirror 210 to become (left) circularly polarized in the orthogonal polarization state. The light 209 travels back towards the (right) circular polarizer 240 and the viewer 205, but this orthogonally (left) circularly polarized light is rejected by the (right) circular polarizer 240. Hence, the viewer 205 does not see his/her own reflections or the environment outside the display system 200 as the reflected light is polarized in a manner to be blocked by the polarizer 240 such that it does not reach the viewing space 202 (see, FIG. 2B at "a").

In contrast, the light 234 from the prop 230 is randomly polarized, and some light 238 reflects off the beam splitter 220 at front or first surface 222 remaining randomly polarized. This light 238 then passes through the circular polarizer 240 after striking second or back/inner surface 243 into the space 202 for viewing by viewer 205 as a virtual image 232 and 233 behind the mirror 220 (as shown with dashed line 237). This virtual image 232, 233 is a "mirror" image of the symmetric half prop 230 that visually completes the prop 230. Similarly, linearly polarized light 216 from the display 210 (e.g., an LCD panel or other useful display device) passes through the beam splitter 220 and remains linearly polarized. Then, some 217 of its light 216 passes through the circular polarizer 242 after striking back/second surface 243 into space 202 to be seen by the viewer 205 as if originating from the location on the physical prop 230. The space behind the mirror 240 may be kept unlit/dark so the display bezel is not seen. The display 210 is rotated to an offset angle, θ, so the screen 211 is not parallel to the mirror 220. In this way, the displayed images (characters, objects, or the like) 214 can be designed (e.g., through left to right or vice versa movements on screen 211) to appear to travel in depth and are not located only in the reflection plane, which could undesirably give away the effect.

FIG. 2C provides a 3D illusion achieved (e.g., from a viewer's perspective) with the use of the mirror-based 3D display system 200. It shows a completed half prop 230 at 232 including the full top surface 231 with reflected surface images 233, and the displayed image 214 appears to be on the completed top surface 233. The viewer 205 is prevented from seeing their own reflection due to inclusion of the polarizer 240 (along with anti-reflection coating 248). Further, the system 200 has a display screen 211 rotated to an offset angle, θ, from parallel with the beam splitter 220 such that the virtual object or effect 214 appears (when is animated and not a still image) to move relative to the plane of symmetry.

Generally, with system 200, the reflections of anything positioned in front of the (right) circular polarizer 240 (e.g., in viewing space 202) will not be visible to the viewer 205 in the display's beam splitter (e.g., half-silvered mirror) 220. In contrast, anything illuminated or transmitting light that is positioned behind the (right) circular polarizer 240 (opposite side of space 202 towards the half-prop 230) with orthogonal (left circular) polarization components will be seen by viewers 205 in the viewing space 202 through the circular polarizer 240. Conversely, anything behind the (right) circular polarizer 240 that emits (or reflects and/or becomes) the same (right circular) polarization state as the (right) circular polarizer 240 will not be seen through the (right) circular polarizer 240 by the viewers 205. Note, the polarizer 240 may be curved (see FIG. 5 below, for example) or may be faceted as well to provide a particular effect and/or to suit a particular facility or implementation environment.

It may, in some embodiments, be desirable to have backdrop imagery appear to the viewer 205 to be located behind the virtual object and half-prop. Because the display 200 has a physical scree and frame, a background simply positioned behind the display would be occluded and blocked, thus revealing the presence of a display screen and frame. The light from a background behind the display would also add to the light from the reflected half-prop, making the reflected portion of the half-prop appear semi-transparent or ghostly. To add a virtual backdrop to achieve extra depth in the 3D illusion or effect, the inventors created the mirror-based 3D display system 300 of FIGS. 3A-3C, with components matching those from system 200 having like numbering and not described again in detail as being understood from the description of FIGS. 2A-2C.

Figure 3A:
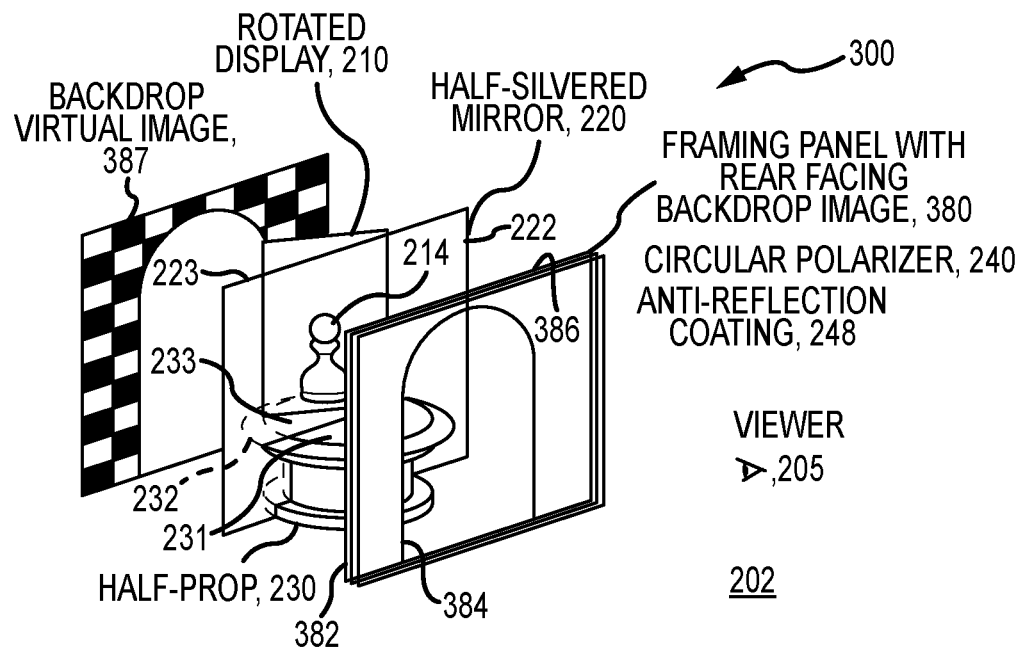
FIGS. 3A-3C are, respectively, a perspective view of an embodiment of a mirror-based 3D display system, similar to that of FIGS. 2A-2C but adapted to provide a backdrop, during operation, a side view of the display system of FIG. 3A showing a ray tracing, and a front view or viewer perspective of the display system of FIGS. 3A and 3B.
Figure 3B:
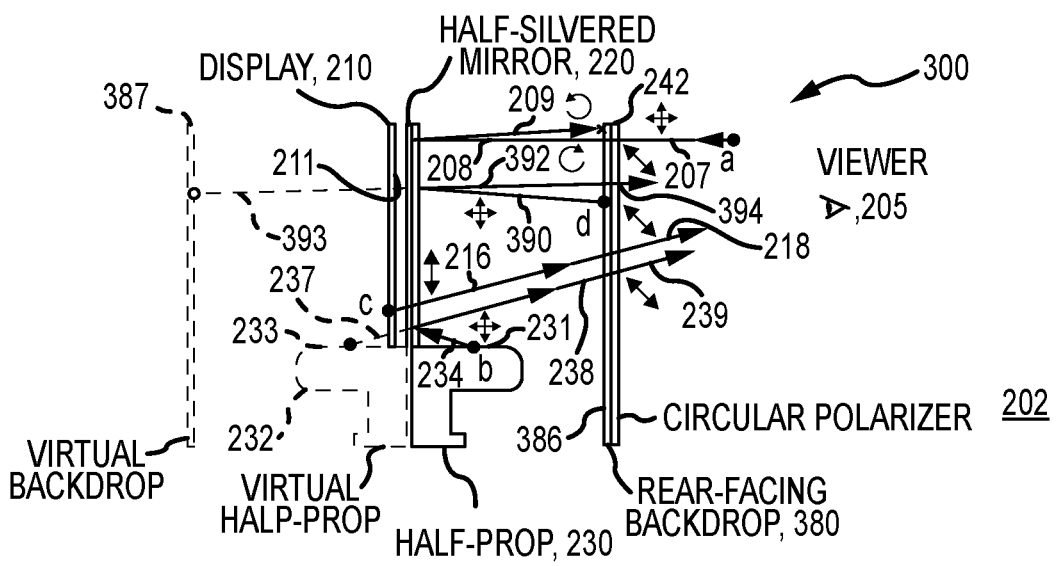
Figure 3C:
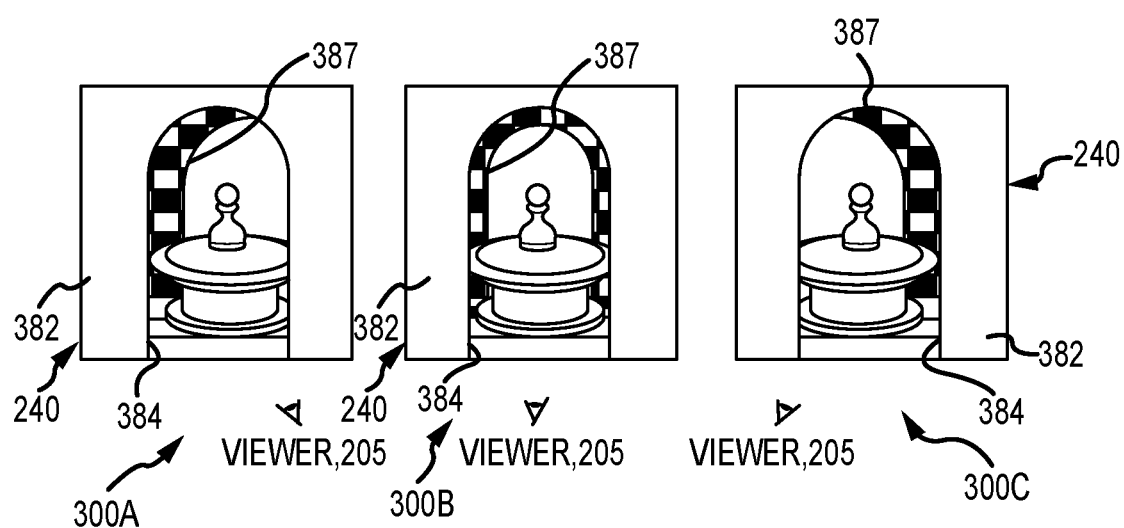

Specifically, as shown in FIGS. 3A-3C, a virtual backdrop 387 is added in system 300 by placing a framing panel 380 is included and placed behind the polarizer 240 (such as abutting or proximate to the second or inner surface 243 of the polarizer 240). The panel 380 is typically formed of an opaque material (such as a plastic sheet, a metal foil, sheet, or layer, or the like) and includes an aperture 384 (e.g., a rectangular shape with a circular arch in this example, but nearly any shape may be used) where a shape is formed by removal or omission of the opaque material of the body/sheet of the panel 380. The aperture 384 may be centrally located as shown. A back side 386 of the panel 380 is configured to display the backdrop virtual image 387 (such as with an applied ink layer, with carvings or attached objects, and/or the like) facing toward the beam splitter 220 (away from the viewing space 202 and viewer 205 so hidden from direct viewing).

Light 390 scattered off the back or second side 386 of the panel 380 (with backdrop imagery, designs, and the like) is randomly polarized and so will the portion 392 that is reflected from the first or outer surface 222 of the half-silvered mirror 220. Some components 394 of the randomly polarized light 392 reflected from mirror 220 and striking the inner or second surface 243 of the circular polarizer 240 are passed through into the space 202 where they can be seen by the viewer 205 concurrently with the virtual image 214 (and the real prop 230 and the virtual prop 232) as a backdrop virtual image (or virtual backdrop) 387 through the aperture 384. The rear facing imagery on back side/ surface 386 of the panel 380 appears as a backdrop 387 located or positioned behind the half-prop 230 as can be seen in FIG. 3C in systems 300A, 300B, and 300C where the viewer 205 has viewing angles to the left, the center, and the right of the aperture 384. As the viewer 205 moves as shown in FIG. 3C, the backdrop 387 appears to have parallax with the prop 230 and displayed image/object 214, which expands the apparent depth of the 3D scene or effect.

While the system 300 is useful in many applications, it may, in some embodiments, be desirable to have backdrop imagery without a frame. With the solid panel 380 with rear-facing imagery on surface 384, the viewer 205 must look through a window or aperture 384, with that window frame 380 also appearing in the reflected background. The inventors recognized that a full aperture background image can be provided that appears behind the half-prop 230 and synthetic character/object 214 to add depth in the 3D illusion or effect. Particularly, the system 400 of FIGS. 4A-4C was designed, with components matching those from system 200 having like numbering and not described again in detail as being understood from the description of FIGS. 2A-2C.

Figure 4A:
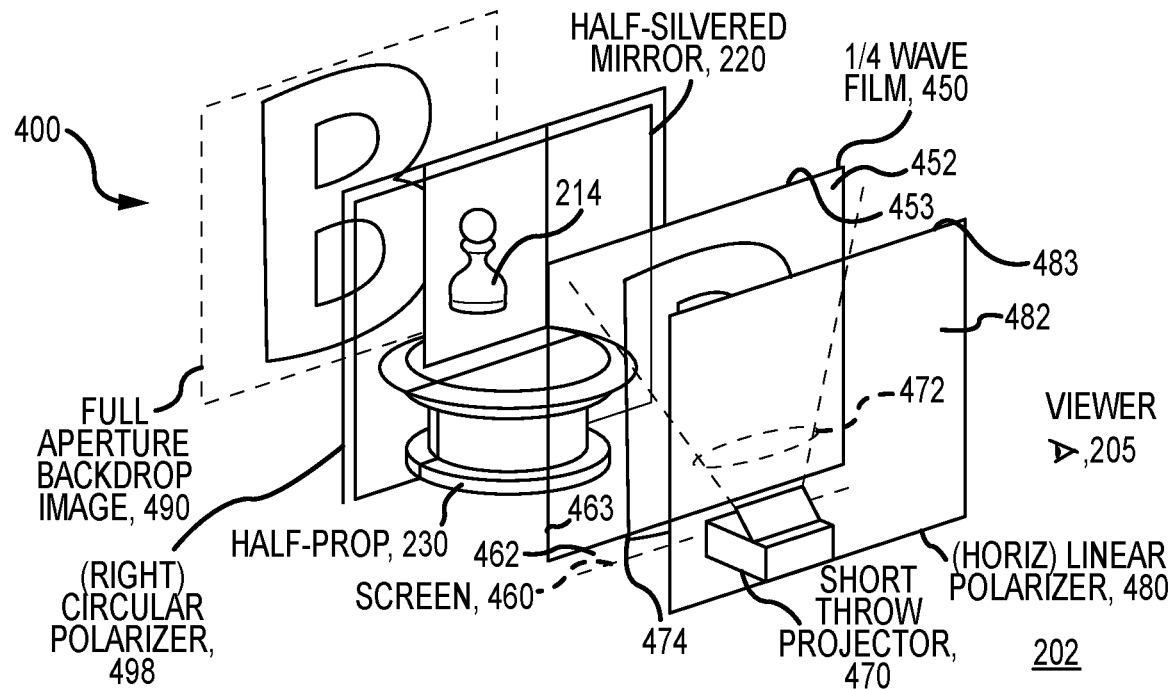
FIGS. 4A-4C are, respectively, a perspective view of an embodiment of a mirror-based 3D display system, similar to that of FIGS. 3A-3C but adapted to provide a backdrop without a framed aperture, during operation, a side view of the display system of FIG. 4A showing a ray tracing, and a front view or viewer perspective of the display system of FIGS. 4A and 4B.

As shown in FIG. 4A, the system 400 represents a modification of the system 200 in that the polarizer 240 is implemented using a ¼ wave film 450 (combined with horizontal polarizer 480 and circular polarizer 498) positioned between the mirror 220 and the viewing space 202 and with a first or outer surface 452 facing the viewing space 202 and a second or inner surface 453 facing the mirror 220. Typically, the film 450 is planar and is arranged to be parallel to the mirror 220. The system 400 further includes a transparent polarization preserving screen 460 positioned between the film/polarizer 450 and the viewing space 202 and oriented to be parallel to the film 450 with a first or outer surface 462 facing the viewing space 202 and a second or inner surface 463 facing the film 450.

Further, the system 400 includes a projector (e.g., a short throw projector) 470 projecting light 472 onto the first or outer surface 462 of the screen 460 to provide a projected image 474, and the projector 470 is positioned out of the line of sight of the viewer 205 (below or above or to the side of the screen 460). Additionally, the system 400 includes a (horizontal) linear polarizer 480 with a first or outer surface 482 facing the viewing space 202 and a second or inner surface 483 facing the first or outer surface of the screen 462. With concurrent operation of the display 210 and the projector 470, the viewer 205 observes the virtual image 214 on the prop's extended surface 231 and further depth is provided by a full aperture backdrop image 490 appearing to the viewer 205 to be in a location behind the prop 230.

Figure 4B:
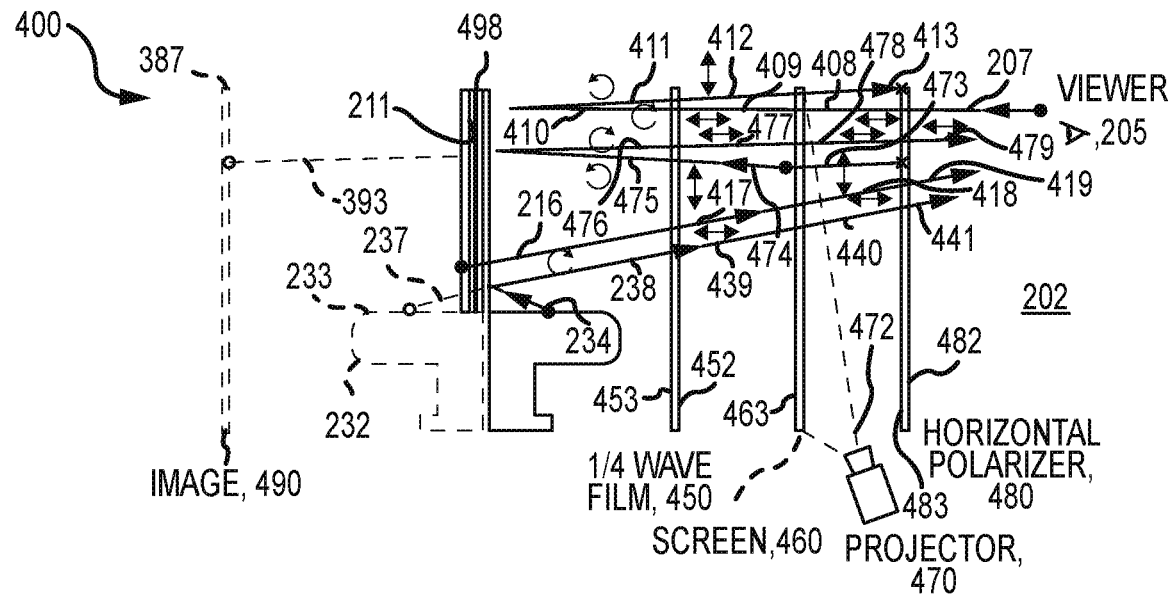
Figure 4C:
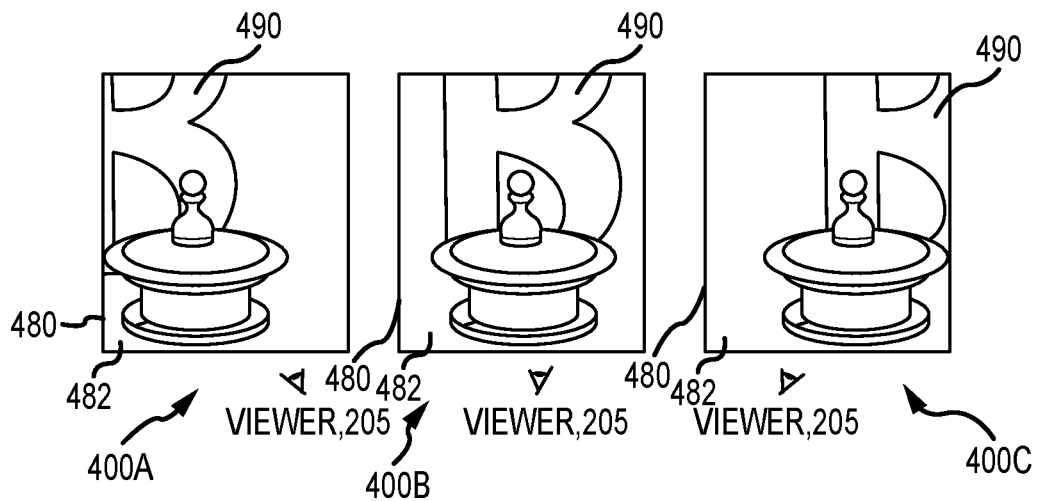

FIG. 4B provides ray tracings showing changes in polarization states that is useful in explaining how the 3D effect with a full aperture backdrop image and without viewer reflection is achieved with the system 400. First, with system 400, the viewer's reflection is blocked. This can be seen with light 207 from the viewer 205 (or room/space 202) being randomly polarized when it strikes the first surface 482 of the horizontal polarizer and passes through as horizontally polarized light 408. The light 408 then strikes the first or outer surface 462 of the transparent polarization preserving screen 460 (e.g., holographic scrim, particle embedded transparent plastic, or other useful screen configuration/ material) and passes through while remaining horizontally polarized light 409. The light 409 then strikes the first or outer surface 452 of the ¼ wave film and is passed through becoming right circularly polarized light 410. The light 410 then strikes the first or outer surface 222 of the mirror 220 and becomes left circularly polarized light 411. The light 411 strikes the second or inner surface 453 of the ¼ wave film 450 and passes through to become vertically polarized light 412. This light 412 strikes the second or inner surface 463 of the screen 460 and passes through remaining vertically polarized light 413, which is blocked by the horizontal polarizer 480 such that the viewer 205 is prevented from seeing their reflection.

With regard to the half-prop 230, light 234 from the prop 230 is randomly polarized (e.g., a combination of left and right circular polarization) and reflects off the mirror's first or outer surface 222 remaining randomly polarized light 238. Its reflection completes the image of the prop 230 as shown with line 237 and prop images 232, 233. The randomly polarized light 238 strikes the second or inner surface 453 of the ¼ wave film 450 and passes through the film 450 remaining randomly polarized light 439 (e.g., as a combination of horizontal and vertical polarization). The light 439 strikes the second or inner surface 463 of the screen 460 and passes through remaining randomly polarized light 440. This light 440 strikes the second or inner surface 483 of the horizontal polarizer 480 and passes through becoming horizontally polarized light 441, which is seen by viewer 205.

With regard to the display 210, light from the display 210 passes through a circular polarizer 498 disposed between the display's screen 211 and the beam splitter 240 to become right circularly polarized light 216. The light 216 passes through the mirror 220 unchanged and strikes the second or inner surface 453 of the ¼ wave film 450 and is passed through to become horizontally polarized light 417. The light 417 then strikes the second or inner surface of the screen 460 and passes through the screen 460 remaining horizontally polarized light 418. The light 418 strikes the second or inner surface 483 of the horizontal polarizer 480, which passes it through as shown 419 for viewing by a viewer 205 in the space 202.

With regard to screen projection that is reflected, light 472 (e.g., vertically polarized light) from the projector 470 is projected onto the first or outer surface 462 of the transparent polarization preserving screen and remains vertically polarized. Some 473 is scattered toward the viewer 205 in the space 202 but is extinguished or blocked by the horizontal polarizer 480 such that the viewer 205 does not see this light 473.

With regard to screen projection transmitted, light 474 scattering from the screen 460 also travels away from the viewing space 202 or into the display system 400 and is also vertically polarized. The light 474 strikes the first or outer surface 452 of the ¼ wave plate and passes through becoming left circularly polarized light 475. A fraction of the light 475 striking the mirror 220 bounces off and becomes right circularly polarized light 476. The light 476 appears to come from a plane behind the half-silvered mirror 220, thus making a virtual image 490 of the projection displaying the extended set to the viewer 205.

The light 476 then passes through the ¼ wave film 450 to become horizontally polarized light 477. The light 477 passes through the polarization preserving screen as shown with light 478 that strikes the second or inner surface 483 of the horizontal polarizer 480, and all or a portion 479 passes through to the space 202 for viewing by viewer 205 (as a full aperture set extension image 490 behind the prop 220). The resulting effect can be seen from three different perspectives for viewer 205 in FIG. 4C with systems 400A-400C.

Figure 5:
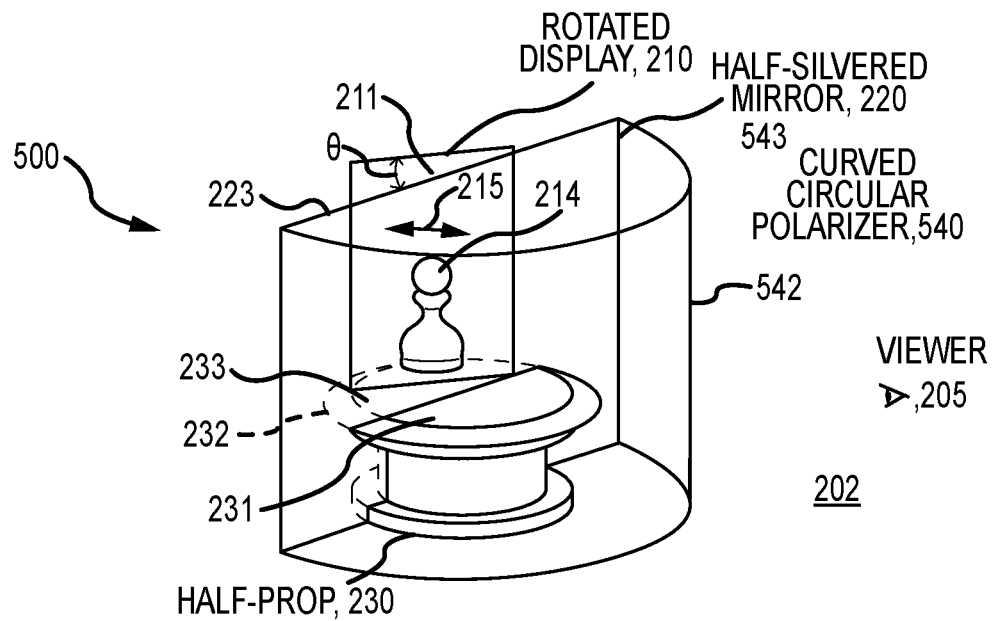
FIG. 5 illustrates a perspective view of an embodiment of a mirror-based 3D display system similar to that of FIG. 2A but utilizing a curved polarizer.

FIG. 5 illustrates a perspective view of an embodiment of a mirror-based 3D display system 500 similar to the system 200 shown in FIG. 2A. The system 500 differs in that the planar polarizer 240 is replaced with a curved polarizer 540, which may take the form of a circular polarizer shaped as a half or partial cylinder (arched or semi-circular cross section rather than a planar cross section). A first or outer surface 542 faces outward toward the viewing space 202 and viewer 205 while a second or inner surface 543 faces and wraps around the prop 230 and may have its ends/edges abutting the sides or side edges of the beam splitter 220 as shown in FIG. 5.

The curved circular polarizer 540 may be used rather than the flat polarizer 240 to reduce reflections off the polarizer's outer surface 542. The curved shape of polarizer 540 may also be used to make the effect to be viewable over a wider field of view and making the display system 500 more compact in size. In some cases, the circular polarizer 540 is applied to an internal container (not shown) for the half-prop 230 (such as one with windows or apertures in its walls) within a larger container (clear walls or again with windows or apertures in its walls). This embodiment is useful as it makes the object inside half full reflected roundness and the container outside simply having a black reflection.

Figure 6:
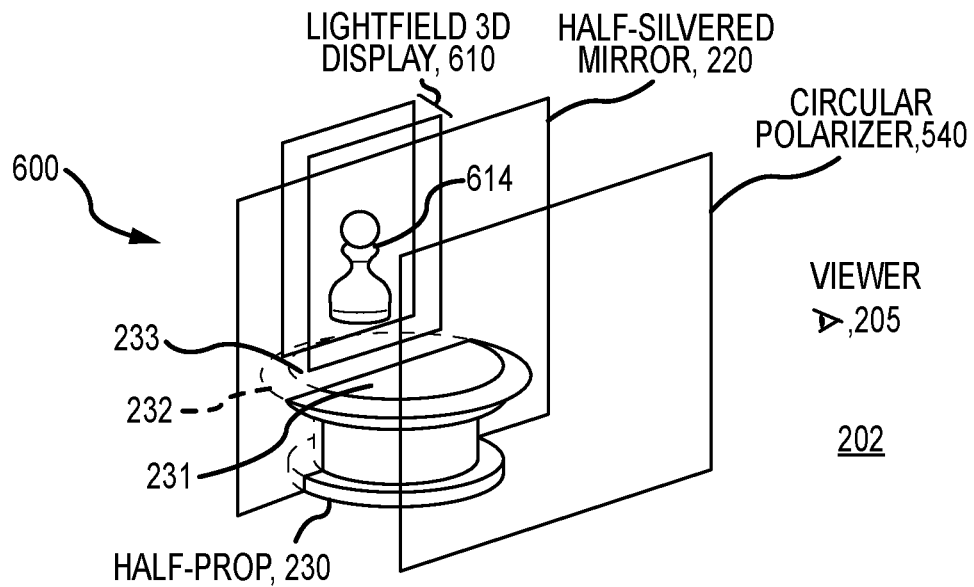
FIG. 6 illustrates a perspective view of another embodiment of a mirror-based 3D display system similar to that of FIG. 2A but utilizing a 3D autostereoscopic display.

FIG. 6 illustrates a perspective view of another embodiment of a mirror-based 3D display system 600 similar to the system 200 shown in FIG. 2A. The system 600 replaces the display 210 with a 3D display 610 operating to display a 3D image 614 on its monitor or display screen, which may be parallel to or rotated an offset angle from the second or inner surface 223 of the beam splitter 220 (as discussed relative to system 200 for display 210). The 3D display 610 may take a variety of forms to provide a 3D image 614 such as a light field display, a multi-layer display, or a volumetric display.

Figure 7:
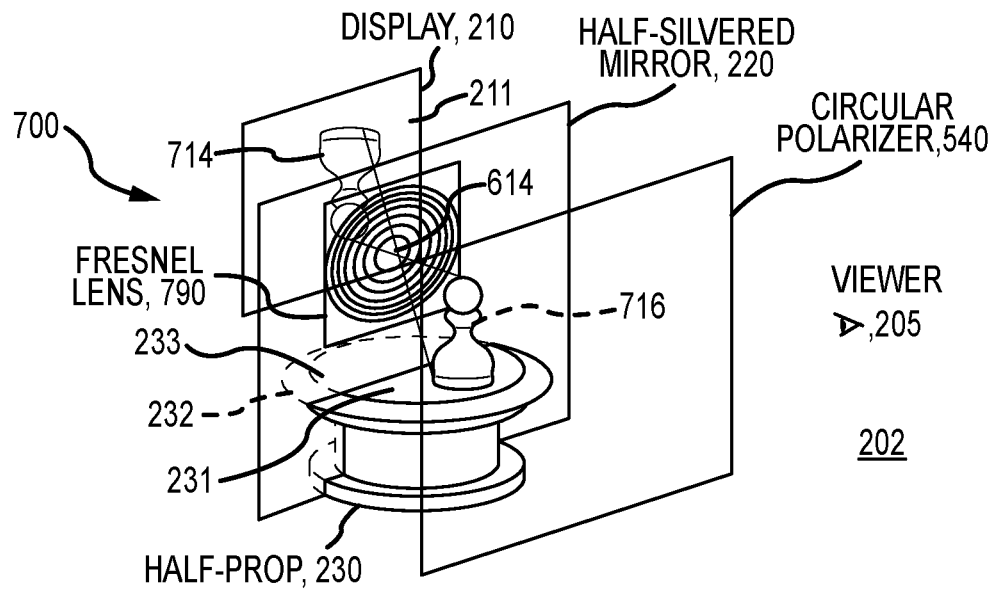
FIG. 7 illustrates a perspective view of another embodiment of a mirror-based 3D display system similar to that of FIG. 2A but utilizing a Fresnel lens to focus the displayed image onto a physical prop.

FIG. 7 illustrates a perspective view of another embodiment of a mirror-based 3D display system 700 that is similar to the system 200 of FIG. 2A except it utilizes a lens 790 (e.g., a Fresnel lens or the like) to focus a displayed image 714 (displayed upside down on screen/monitor 211 of display 210) at a plane on a physical prop (e.g., onto surface 231 of half-prop 230). The Fresnel lens 790 is disposed between the display screen/monitor 211 and second or inner surface 223 of the beam splitter 220 (e.g., to be parallel to the surface 223). The lens 790 is selected/configured, positioned, and oriented in the system 700 to relay the image 714 on the display 210 to appear as a real image 716 in front of the first or outer surface 222 of the half-silvered mirror 220 (e.g., on surface 231 of the prop 230).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A display system for providing a three-dimensional (3D) effect with controlled reflections, comprising:
   a viewing space;
   a planar beam splitter with a first surface facing the viewing space and a second surface facing away from the viewing space;
   a polarizer disposed between the first surface of the beam splitter and the viewing space blocking light originating in the viewing space and reflected by the beam splitter;
   a physical prop positioned between the beam splitter and the polarizer;
   a display with a display screen facing the second surface of the beam splitter, wherein the display is operated to provide a displayed image on the display screen viewable in the viewing space concurrently with light from the physical prop reflected by the beam splitter through the polarizer; and a framing panel disposed between the polarizer and the physical prop, wherein the framing panel includes an aperture passing light to and from the viewing space and wherein the framing panel further includes a back surface facing the first surface of the beam splitter and including backdrop imagery or objects.

2. The display system of claim 1, wherein the polarizer is a circular polarizer with a planar or curved body.

3. The display system of claim 2, wherein the polarizer further comprises an anti-reflection coating on a surface of the planar or curved body facing the viewing space.

4. The display system of claim 1, wherein the display comprises a 3D display.

5. The display system of claim 1, further comprising a lens disposed between the display screen and the beam splitter focusing the displayed image to a location between the beam splitter and the polarizer.

6. The display system of claim 1, wherein the polarizer comprises a ¼ wave film proximate to the physical prop and a horizontal polarizer proximate to the viewing space and wherein the display system further comprises a transparent polarization preserving screen disposed between the ¼ wave film and the horizontal polarizer, a projector projecting a backdrop image onto a surface of the transparent polarization preserving screen facing the viewing space, and a circular polarizer disposed between the display and the beam splitter.

7. The display system of claim 6, wherein the ¼ wave film and the horizontal polarizer are both planar, are spaced apart, and are arranged to be parallel.

8. The display system of claim 6, wherein the projector is a short throw video projector and wherein the projector and display are concurrently operated to provide the displayed image and to project the backdrop image.

9. The display system of claim 1, wherein the physical prop is a half prop positioned to abut the first surface of the beam splitter.

10. The display system of claim 1, wherein the display is rotated at an offset angle in the range of 15 to 60 degrees to the second surface of the beam splitter.

11. A display system for providing a three-dimensional (3D) effect with controlled reflections to a viewer in a viewing space, comprising:
a beam splitter with a first surface facing the viewing space and a second surface facing away from the viewing space;
a polarizer disposed between the first surface of the beam splitter and the viewing space blocking light originating in the viewing space and reflected by the beam splitter;
a physical prop positioned between the beam splitter and the polarizer;
a display providing an image to the second surface of the beam splitter, wherein the display is rotated from the second surface of the beam splitter by an offset angle in the range of 15 to 60 degrees; and
an opaque framing panel disposed between the polarizer and the physical prop, wherein the framing panel includes an aperture passing light to and from the viewing space and wherein the framing panel further includes a back surface facing the first surface of the beam splitter and including backdrop imagery or objects.

12. The display system of claim 11, wherein the polarizer is a circular polarizer with a planar or curved body.

13. The display system of claim 11, wherein the display comprises a 3D display.

14. The display system of claim 11, further comprising a lens disposed between the display screen and the beam splitter focusing the image to a location between the beam splitter and the polarizer.

15. The display system of claim 11, wherein the polarizer comprises a ¼ wave film proximate to the physical prop and a horizontal polarizer proximate to the viewing space and wherein the display system further comprises a transparent polarization preserving screen disposed between the ¼ wave film and the horizontal polarizer, a projector projecting a backdrop image onto a surface of the transparent polarization preserving screen facing the viewing space, and a circular polarizer disposed between the display and the beam splitter.

16. The display system of claim 11, wherein the physical prop is a half prop positioned to abut the first surface of the beam splitter.

17. A display system for providing a three-dimensional (3D) effect with controlled reflections to viewers in a viewing space, comprising:
a half-silvered mirror with a first surface facing the viewing space and a second surface facing away from the viewing space;
a circular polarizer disposed between the first surface of the beam splitter and the viewing space blocking light originating in the viewing space and reflected by the beam splitter;
a half prop positioned between the half-silvered mirror and the circular polarizer with a planar back wall facing and substantially co-planar with the first surface of the half-silvered mirror;
a display with a display screen facing the second surface of the half-silver mirror, wherein the display is operated to provide a displayed image on the display screen viewable in the viewing space concurrently with light from the half prop reflected by the beam splitter through the circular polarizer; and
a framing panel disposed between the circular polarizer and the half prop, wherein the framing panel includes an aperture passing light to and from the viewing space and wherein the framing panel further includes a back surface facing the first surface of the half-silvered mirror and including backdrop imagery or objects.

18. The display system of claim 17, wherein the display screen is rotated about a longitudinal axis parallel to a longitudinal axis of the half-silvered mirror to offset angle in the range of 15 to 60 degrees measured between the second surface of the half-silvered mirror and the display screen.

19. The display system of claim 17, wherein the display comprises a 3D display.

20. The display system of claim 17, further comprising a lens disposed between the display screen and the half-silvered mirror focusing the displayed image to a location between the half-silvered mirror and the circular polarizer.

21. A display system for providing a three-dimensional (3D) effect with controlled reflections, comprising:
a viewing space;
a planar beam splitter with a first surface facing the viewing space and a second surface facing away from the viewing space;

a polarizer disposed between the first surface of the beam splitter and the viewing space blocking light originating in the viewing space and reflected by the beam splitter;

a physical prop positioned between the beam splitter and the polarizer;

a display with a display screen facing the second surface of the beam splitter, wherein the display is operated to provide a displayed image on the display screen viewable in the viewing space concurrently with light from the physical prop reflected by the beam splitter through the polarizer; and a lens disposed between the display screen and the beam splitter focusing the displayed image to a location between the beam splitter and the polarizer.

22. The display system of claim 21, wherein the polarizer is a circular polarizer with a planar or curved body.

23. The display system of claim 22, wherein the polarizer further comprises an anti-reflection coating on a surface of the planar or curved body facing the viewing space.

24. The display system of claim 21, wherein the display comprises a 3D display.

25. The display system of claim 21, wherein the polarizer comprises a ¼ wave film proximate to the physical prop and a horizontal polarizer proximate to the viewing space and wherein the display system further comprises a transparent polarization preserving screen disposed between the ¼ wave film and the horizontal polarizer, a projector projecting a backdrop image onto a surface of the transparent polarization preserving screen facing the viewing space, and a circular polarizer disposed between the display and the beam splitter.

26. The display system of claim 25, wherein the ¼ wave film and the horizontal polarizer are both planar, are spaced apart, and are arranged to be parallel.

27. The display system of claim 25, wherein the projector is a short throw video projector and wherein the projector and display are concurrently operated to provide the displayed image and to project the backdrop image.

28. The display system of claim 21, wherein the display is rotated at an offset angle in the range of 15 to 60 degrees to the second surface of the beam splitter.

29. A display system for providing a three-dimensional (3D) effect with controlled reflections, comprising:

a viewing space;

a planar beam splitter with a first surface facing the viewing space and a second surface facing away from the viewing space;

a polarizer disposed between the first surface of the beam splitter and the viewing space blocking light originating in the viewing space and reflected by the beam splitter;

a physical prop positioned between the beam splitter and the polarizer; and a display with a display screen facing the second surface of the beam splitter, wherein the display is operated to provide a displayed image on the display screen viewable in the viewing space concurrently with light from the physical prop reflected by the beam splitter through the polarizer, wherein the polarizer comprises a ¼ wave film proximate to the physical prop and a horizontal polarizer proximate to the viewing space, and wherein the display system further comprises a transparent polarization preserving screen disposed between the ¼ wave film and the horizontal polarizer, a projector projecting a backdrop image onto a surface of the transparent polarization preserving screen facing the viewing space, and a circular polarizer disposed between the display and the beam splitter.

30. The display system of claim 29, wherein the display comprises a 3D display.

31. The display system of claim 29, wherein the ¼ wave film and the horizontal polarizer are both planar, are spaced apart, and are arranged to be parallel.

32. The display system of claim 29, wherein the projector is a short throw video projector and wherein the projector and display are concurrently operated to provide the displayed image and to project the backdrop image.

33. The display system of claim 29, wherein the display is rotated at an offset angle in the range of 15 to 60 degrees to the second surface of the beam splitter.

34. A display system for providing a three-dimensional (3D) effect with controlled reflections to a viewer in a viewing space, comprising:

a beam splitter with a first surface facing the viewing space and a second surface facing away from the viewing space;

a polarizer disposed between the first surface of the beam splitter and the viewing space blocking light originating in the viewing space and reflected by the beam splitter;

a physical prop positioned between the beam splitter and the polarizer;

a display providing an image to the second surface of the beam splitter, wherein the display is rotated from the second surface of the beam splitter by an offset angle in the range of 15 to 60 degrees; and a lens disposed between the display and the beam splitter focusing the image to a location between the beam splitter and the polarizer.

35. The display system of claim 34, wherein the polarizer is a circular polarizer with a planar or curved body.

36. The display system of claim 34, wherein the display comprises a 3D display.

37. The display system of claim 34, wherein the polarizer comprises a ¼ wave film proximate to the physical prop and a horizontal polarizer proximate to the viewing space and wherein the display system further comprises a transparent polarization preserving screen disposed between the ¼ wave film and the horizontal polarizer, a projector projecting a backdrop image onto a surface of the transparent polarization preserving screen facing the viewing space, and a circular polarizer disposed between the display and the beam splitter.

38. A display system for providing a three-dimensional (3D) effect with controlled reflections to a viewer in a viewing space, comprising:

a beam splitter with a first surface facing the viewing space and a second surface facing away from the viewing space;

a polarizer disposed between the first surface of the beam splitter and the viewing space blocking light originating in the viewing space and reflected by the beam splitter;

a physical prop positioned between the beam splitter and the polarizer; and a display providing an image to the second surface of the beam splitter, wherein the display is rotated from the second surface of the beam splitter by an offset angle in the range of 15 to 60 degrees, wherein the polarizer comprises a ¼ wave film proximate to the physical prop and a horizontal polarizer proximate to the viewing space, and wherein the display system further comprises a transparent polarization preserving screen disposed between the ¼ wave film and the horizontal polarizer, a projector projecting a backdrop image onto a surface of the transparent polarization preserving screen facing the viewing space, and a circular polarizer disposed between the display and the beam splitter.

39. The display system of claim 38, wherein the display comprises a 3D display.

40. A display system for providing a three-dimensional (3D) effect with controlled reflections to viewers in a viewing space, comprising:

a half-silvered mirror with a first surface facing the viewing space and a second surface facing away from the viewing space;

a circular polarizer disposed between the first surface of the beam splitter and the viewing space blocking light originating in the viewing space and reflected by the beam splitter;

a half prop positioned between the half-silvered mirror and the circular polarizer with a planar back wall facing and substantially co-planar with the first surface of the half-silvered mirror;

a display with a display screen facing the second surface of the half-silver mirror, wherein the display is operated to provide a displayed image on the display screen viewable in the viewing space concurrently with light from the half prop reflected by the beam splitter through the circular polarizer; and a lens disposed between the display screen and the half-silvered mirror focusing the displayed image to a location between the half-silvered mirror and the circular polarizer.

41. The display system of claim 40, wherein the display screen is rotated about a longitudinal axis parallel to a longitudinal axis of the half-silvered mirror to offset angle in the range of 15 to 60 degrees measured between the second surface of the half-silvered mirror and the display screen.

42. The display system of claim 40, wherein the display comprises a 3D display.

* * * * *